(12) United States Patent
Xie et al.

(10) Patent No.: US 8,385,062 B2
(45) Date of Patent: Feb. 26, 2013

(54) HARD DISK DEVICE FRAME

(75) Inventors: Fu-Qin Xie, Taipei Hsien (TW); Hung-Ming Chang, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 139 days.

(21) Appl. No.: 12/841,159

(22) Filed: Jul. 21, 2010

(65) Prior Publication Data
US 2011/0249390 A1 Oct. 13, 2011

(30) Foreign Application Priority Data
Apr. 13, 2010 (CN) .......................... 2010 1 0145437

(51) Int. Cl.
H05K 5/00 (2006.01)
H05K 7/00 (2006.01)

(52) U.S. Cl. ......... 361/679.33; 361/679.37; 361/679.38; 361/679.39

(58) Field of Classification Search ............. 361/679.33, 361/679.37, 679.38, 679.39
See application file for complete search history.

(56) References Cited

U.S. PATENT DOCUMENTS

| | | | | |
|---|---|---|---|---|
| 5,561,893 | A | * | 10/1996 | Lee .................................. 29/434 |
| 5,701,231 | A | * | 12/1997 | Do et al. .................. 361/679.48 |
| 5,704,252 | A | * | 1/1998 | Loeffler ..................... 74/473.25 |
| 6,111,754 | A | * | 8/2000 | Abbott et al. ................. 361/724 |
| 6,233,152 | B1 | * | 5/2001 | Abbott et al. ................. 361/725 |
| 7,042,721 | B2 | * | 5/2006 | Olesiewicz et al. ........... 361/695 |
| 7,433,183 | B2 | * | 10/2008 | Huang ..................... 361/679.33 |
| 7,484,195 | B1 | * | 1/2009 | Korobkov ..................... 716/113 |
| 2006/0113103 | A1 | | 6/2006 | Han |

FOREIGN PATENT DOCUMENTS

| | | |
|---|---|---|
| TW | 450510 | 8/2001 |
| TW | 523148 | 3/2003 |
| TW | M367551 | 10/2009 |
| TW | M371913 | 1/2010 |

* cited by examiner

*Primary Examiner* — Anthony Haughton
(74) *Attorney, Agent, or Firm* — CKC & Partners Co., Ltd.

(57) ABSTRACT

A hard disk device frame for fastening a plurality of hard disk devices, a fan, and a main board is disclosed. The hard disk device frame includes a rotary piece, a back chassis, and plural hinges. The rotary piece includes a front chassis having an opening; and a bracket fixed on the front chassis, wherein the hard disk devices enter the opening and couple to the bracket. The fan and the main board are fixed on the back chassis. The hinges connect the front chassis and the back chassis, thereby the rotary piece is pivoted relative to the back chassis to hide or expose the fan and the main board on the back chassis.

13 Claims, 7 Drawing Sheets

HARD DISK DEVICE FRAME

RELATED APPLICATIONS

This application claims priority to Chinese Application Serial Number 201010145437.6, filed Apr. 13, 2010, which is herein incorporated by reference.

BACKGROUND

1. Field of Invention

The present invention relates to a hard disk device frame. More particularly, the present invention relates to a hard disk device frame for a server.

2. Description of Related Art

Information technology and the computer industry are highly developed now. People rely heavily on computer systems. Therefore, computer servers with higher calculation capacity and higher stability are important for computer systems. Due to increasingly reduced office space, an area occupied by a computer server must also be reduced. Thus, the hardware arrangement in the computer server is restricted by reduced space.

The computer server, such as a blade server may have many hard disk devices or other devices to provide data accessing function. The main boards, the hard disk devices, the fans are assembled in the case of the server case. However, the space in the server is limited. Therefore there is a need to assemble the hard disk devices, the main board, and the fan efficiently and reduce the component for positioning the devices.

SUMMARY

An object of the invention is to provide a hard disk frame to reduce assembly steps and material cost.

An aspect of the invention provides a hard disk device frame for fastening a plurality of hard disk devices, a fan, and a main board. The hard disk device frame includes a rotary piece, a back chassis, and plural hinges. The rotary piece includes a front chassis having an opening; and a bracket fixed on the front chassis, wherein the hard disk devices enter the opening and couple to the bracket. The fan and the main board are fixed on the back chassis. The hinges connect the front chassis and the back chassis, thereby the rotary piece is pivoted relative to the back chassis to hide or expose the fan and the main board on the back chassis.

The front chassis includes a front board and an upper board; the opening is disposed on the front board; the back chassis includes a back board and a lower board; the hinges connect the front board to the lower board. The bracket includes a first bracket sidewall, a second bracket sidewall and a third bracket sidewall connected to opposite sides of the first bracket sidewall; the first bracket sidewall is substantially perpendicular to the lower board; the second bracket sidewall and the third bracket sidewall are substantially perpendicular to the first bracket sidewall. The hard disk device frame further includes plural hard disk device connectors disposed on the first bracket sidewall, wherein the hard disk devices are coupled to the hard disk connectors. The back board includes plural cooling holes; the fan is coupled to the back board and is located between the first bracket sidewall and the back board. The rotary piece further includes a cage fixed in the front chassis and the bracket; the cage includes a first cage sidewall, and second cage sidewall and a third cage sidewall connected to opposite sides of the first cage sidewall; the second cage sidewall and the third cage sidewall are perpendicular to the first cage sidewall; the second cage sidewall is fixed on the upper board. The hard disk device frame further includes plural positioning pins disposed on the lower board, wherein the main board is positioned on the lower board with the positioning pins. The main board is disposed between the third cage sidewall and the lower board. The hard disk frame further includes plural blind riveting holes disposed on the front chassis, the bracket, and the cage to fasten the front chassis, the bracket, and the cage as the rotary piece. The hard disk device frame further includes plural screw holes disposed on the rotary piece and the back chassis to fasten the rotary piece to the back chassis.

The rotary piece can be pivoted relative to the back chassis to expose or hide the fan, the main board, and the hard disk devices for easily assembling or changing the fan, the main board, and the hard disk devices. The additional components for fastening the fan and the main board can be omitted and the cost of assembly can be reduced.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
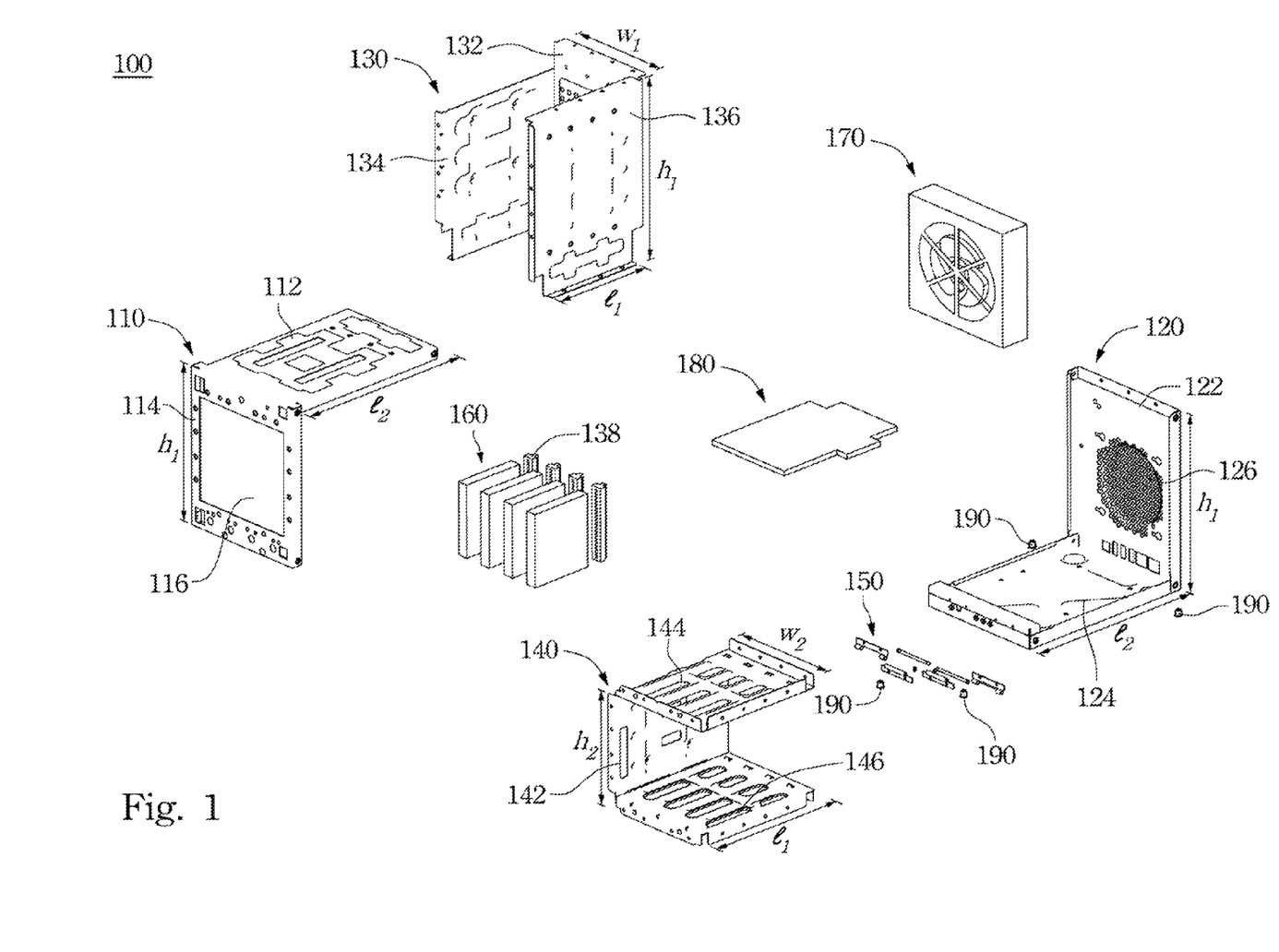
FIG. 1 is an explosion diagram of an embodiment of the hard disk device frame of the invention.

Refer to FIG. 1. FIG. 1 is an explosion diagram of an embodiment of the hard disk device frame of the invention. The hard disk device frame 100 includes a front chassis 110, a back chassis 120, a bracket 130, a cage 140, and plural hinges 150. Plural hard disk devices 160 can be fastened in the bracket 130. The cage 140 is assembled in the bracket 130 to enhance the strength of the bracket 130 and to protect the hard disk devices 160 in the bracket 130 from shock. The bracket 130, the cage 140, and the front chassis 110 are fastened as a rotary piece, and the hinges 150 connect the front chassis 110 and the back chassis 120. The rotary piece including the front chassis 110 can be pivoted related to the back chassis 120 with the hinge 150.

The front chassis 110 includes an upper board 112 and a front board 114. The upper board 112 is connected to the front board 114. The upper board 112 is substantially perpendicular to the front board 114. The front board 114 has an opening 116. The hard disk devices 160 can enter the opening 116 and couple to the bracket 130. The hard disk devices 160 can enter the rotary piece via the opening 116. The back chassis 120 includes a back board 122 and a lower board 124. The lower board 124 is connected to the back board 122. The back board 122 is substantially perpendicular to the lower board 124. The hinges 150 connect the front board 114 of the front chassis 110 to the lower board 124 of the back chassis 120, so that the front chassis 110 can be pivoted relative to the back chassis 120.

The bracket 130 includes a first bracket sidewall 132, and a second bracket sidewall 134 and a third bracket sidewall 136 connected to opposite sides of the first bracket sidewall 132. The second bracket sidewall 134 and the third bracket sidewall 136 are substantially perpendicular to the first bracket sidewall 132. The first bracket sidewall 132 is substantially perpendicular to the lower board 124. Plural hard disk device connectors 138 are disposed on the first bracket sidewall 132. The hard disk devices 160 are coupled to the hard disk device connectors 138 of the first bracket sidewall 132.

The width $w_2$ of the cage 140 is smaller than the width $w_1$ of the bracket 130, so that the cage 140 can be placed in the bracket 130. The cage 140 has a first cage sidewall 142, a second cage sidewall 144 and a third cage sidewall 146 connected to opposite sides of the first cage sidewall 142. The second cage sidewall 144 and the third cage sidewall 146 are substantially perpendicular to the first cage sidewall 142. The first cage sidewall 142 is substantially perpendicular to the first bracket sidewall 132. The first cage sidewall 142 is substantially perpendicular to the lower board 124. The second cage sidewall 144 is substantially perpendicular to the second bracket sidewall 134. The second cage sidewall 144 can be fastened on the upper board 112. The third cage sidewall 146 is arranged above the lower board 124.

The length $l_1$ of the bracket 130 and the cage 140 is smaller than the length $l_2$ of upper board 112 and the lower board 124. Therefore a space can be formed between the first bracket sidewall 132 and the back board 122, and the fan 170 is placed in this space. Plural cooling holes 126 are formed on the back board 122. The position of the cooling holes 126 is related to the fan 170.

The height $h_1$ of the front chassis 110, the back chassis 120, and the bracket 130 is bigger than the height $h_2$ of cage 140. The second cage sidewall 144 is fastened on the upper board 112. Therefore a space would be formed between the third cage sidewall 146 and the lower board 124, and the main board 18 is disposed in the space between the third cage sidewall 146. The hard disk device frame 100 further includes plural positioning pins 190 disposed on the lower board 124. The main board 180 is positioned on the lower board 124 with the positioning pins 190.

Figure 2:
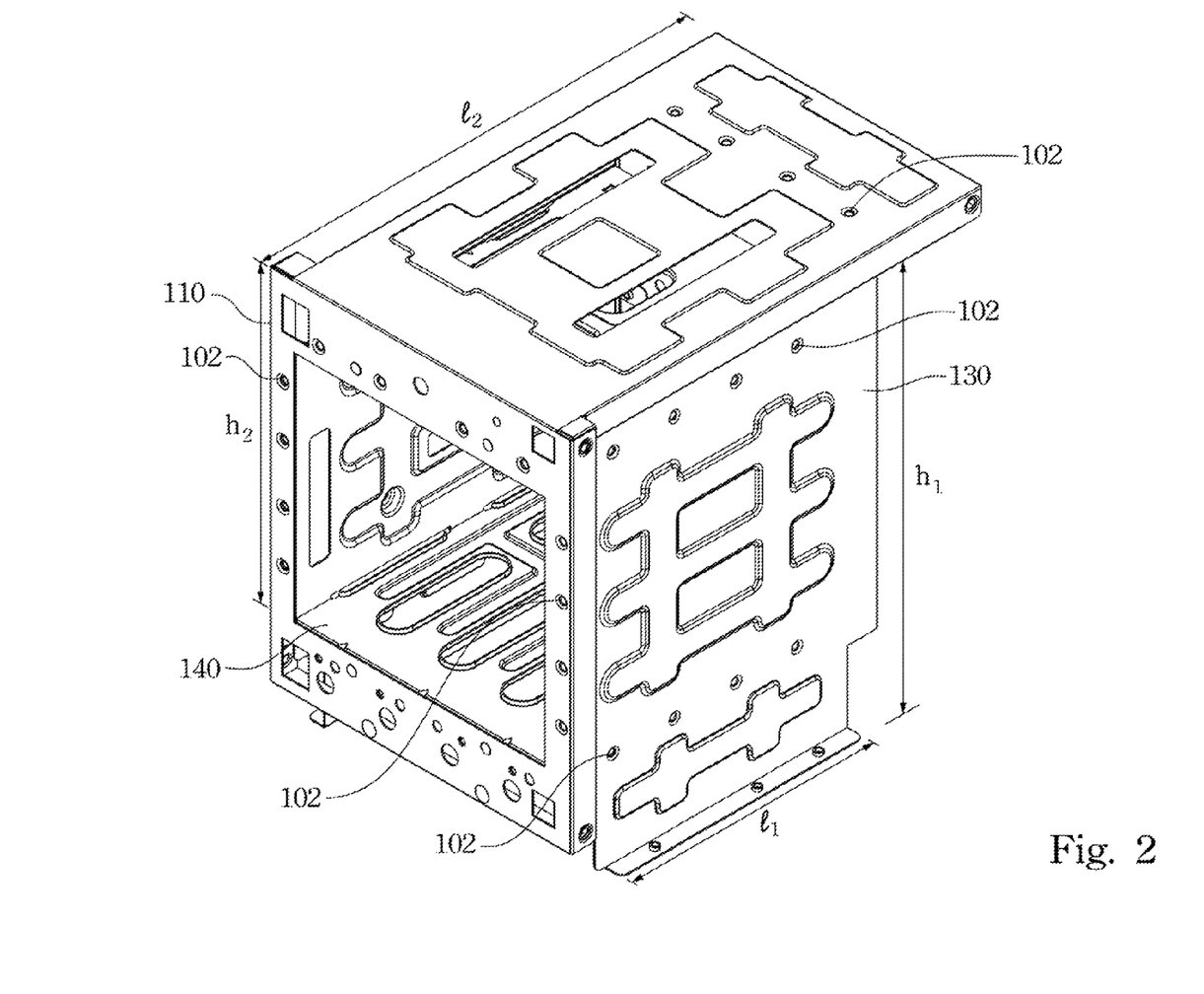
FIG. 2 is a schematic diagram of the rotary piece of the invention.

Refer to FIG. 2. FIG. 2 is a schematic diagram of the rotary piece of the invention. The rotary piece includes the front chassis 110, the bracket 130, and the cage 140. Plural blind riveting holes 102 are formed on the front chassis 110, the bracket 130, and the cage 140 to connect the front chassis 110, the bracket 130, and the cage 140 as the rotary piece with a blind riveting process. The length $l_2$ of the upper board 112 is bigger than the length $l_1$ of the bracket 130 and the cage 140. The height $h_1$ of the bracket 130 is bigger than the height $h_2$ of the cage 140.

Figure 3A:
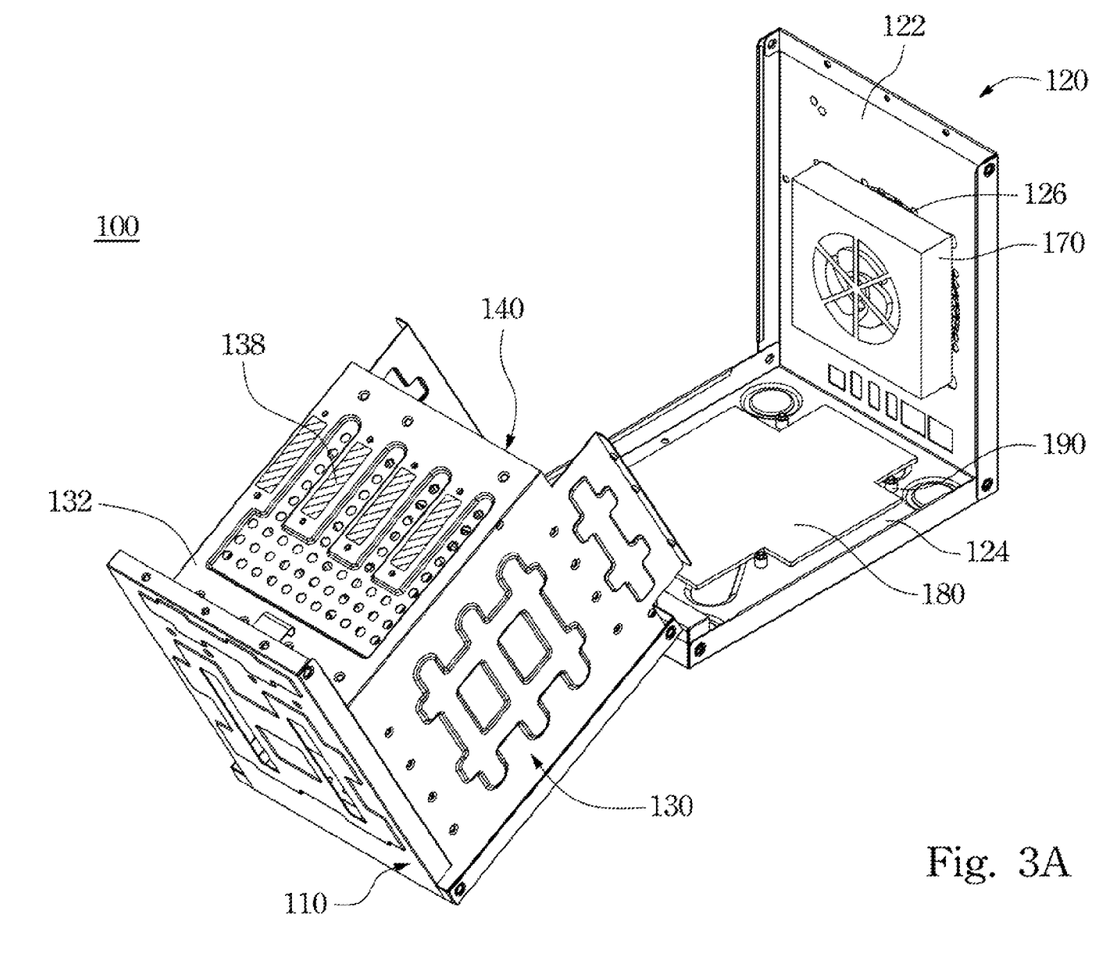
FIG. 3A to FIG. 3C are schematic diagrams of different assembly states of the hard disk device frame of the invention.
Figure 3B:
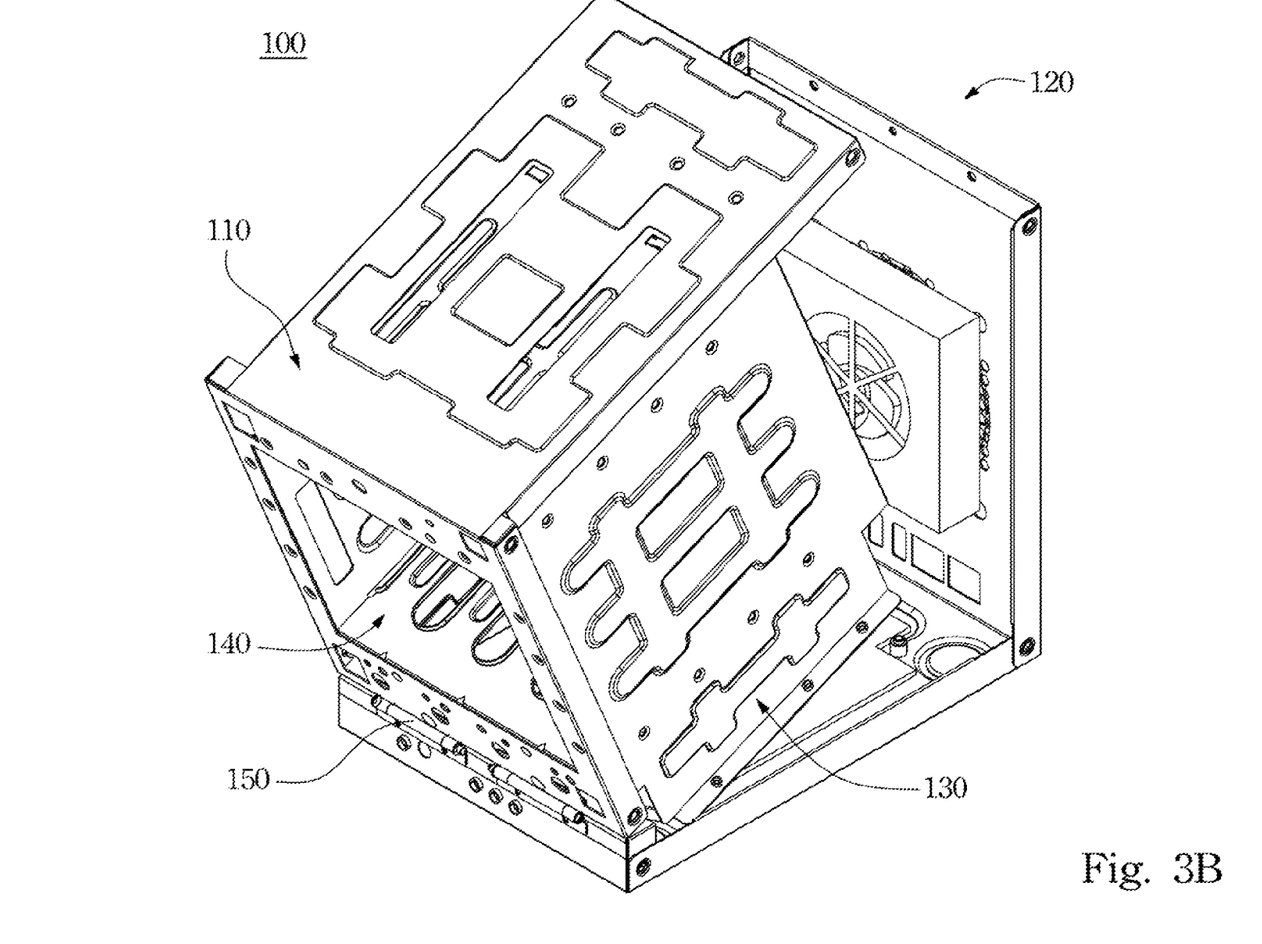
Figure 3C:
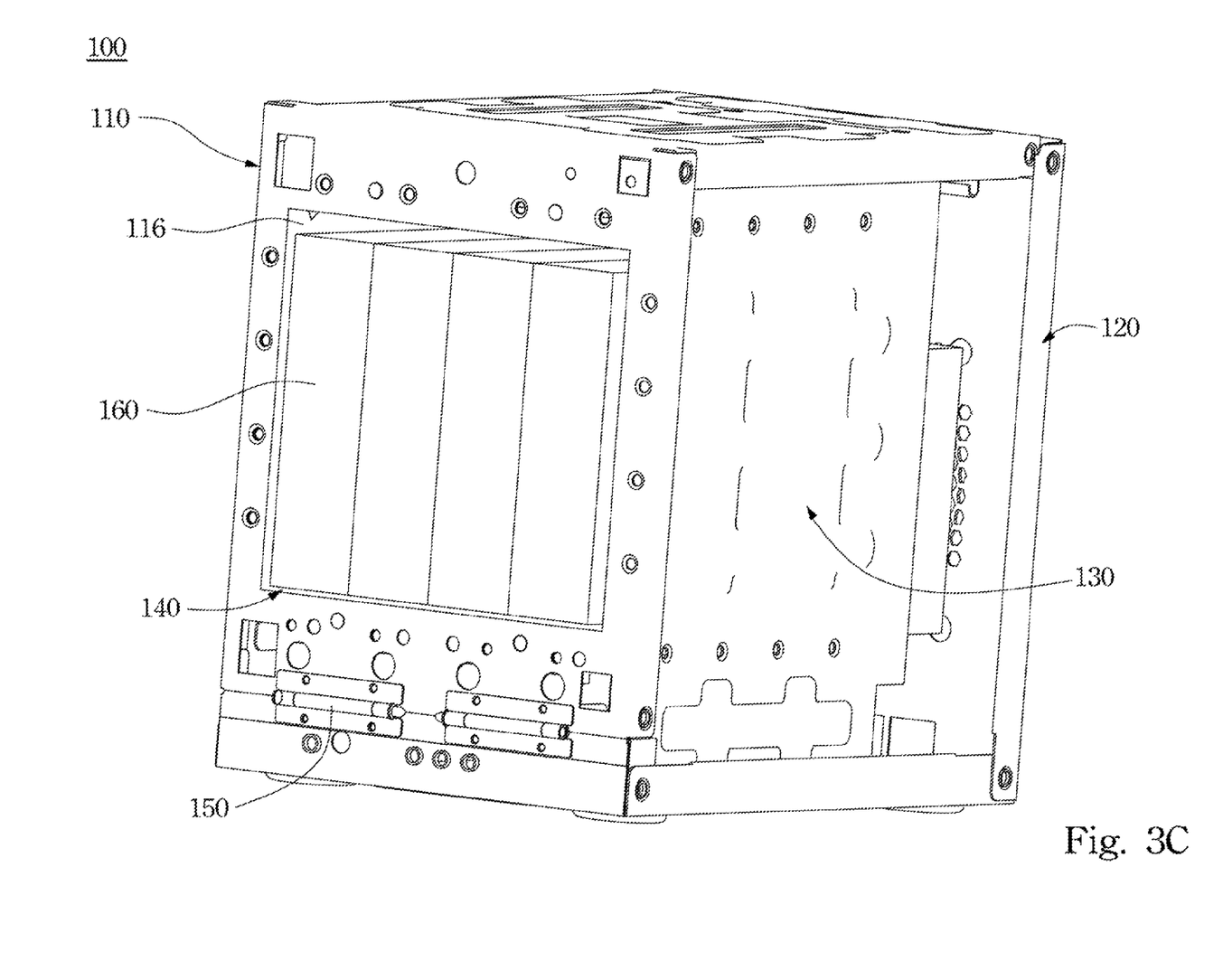

Refer to FIG. 3A to FIG. 3C. FIG. 3A to FIG. 3C are schematic diagrams of different assembly states of the hard disk device frame of the invention. FIG. 3A is an open state of the hard disk device frame 100. The front chassis 110, the bracket 130, and the cage 140 are assembled as the rotary piece, and the rotary piece can be pivoted and be opened related to the back chassis 120 with the hinges (see FIG. 1). The rotary piece is opened to expose the back chassis 120.

Then the main board 180 is positioned on the lower board 124 by the positioning pins 190, and the fan 170 is fastened on the back board 122 related to the cooling holes 126. The hard disk device connectors 138 are disposed on the first bracket sidewall 132.

Referring to FIG. 3B, a user can apply force on the hard disk device frame 100, including pushing the rotary piece or the back chassis 120. Therefore the rotary piece including the front chassis 110, the bracket 130, and the cage 140 is pivoted close toward the back chassis 120.

Referring to FIG. 3C, the rotary piece including the front chassis 110, the bracket 130, and the cage 140 has been pivoted close to the back chassis 120. The hard disk devices 160 can enter the opening and couple to the hard disk connectors (see FIG. 3A) of the bracket 130.

According to FIG. 3A to FIG. 3C, the rotary piece including the front chassis 110, the bracket 130, and the cage 140 can be pivoted relative to the back chassis 120 with the hinges 150 in the hard disk device frame 100. The rotary piece can be easily opened or closed to the back chassis 120 to expose or hide the fan 170 and the main board 180 during assembly. The main board 180 can be positioned on the front chassis 110 with the positioning protrusions 190.

Figure 4A:
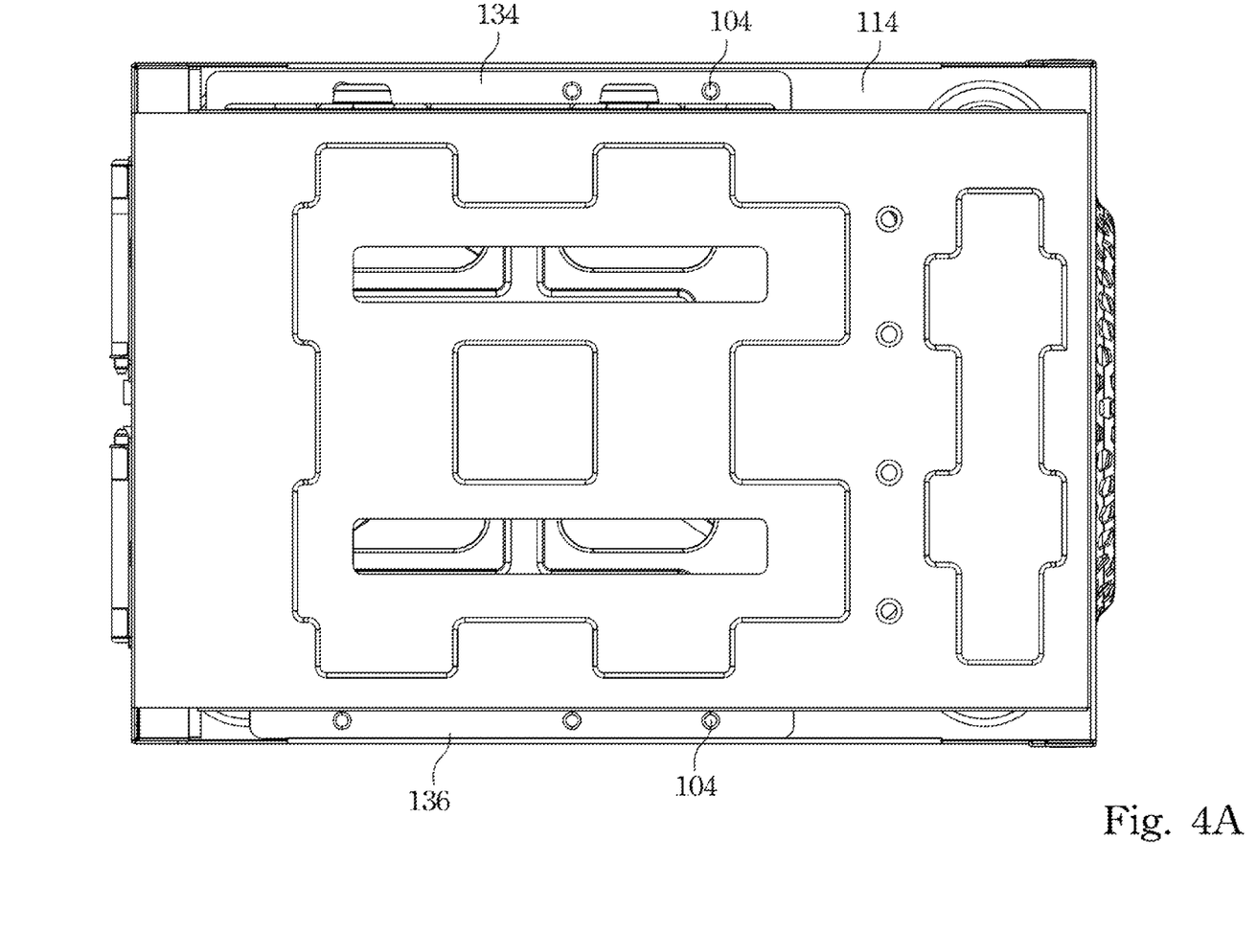
FIG. 4A is a top view diagram of the assembled hard disk frame of the invention.

Refer to FIG. 4A. FIG. 4A is a top view diagram of the assembled hard disk frame of the invention. Plural screw holes 104 are formed on the second bracket sidewall 134 and the third bracket 136. The rotary piece with the front chassis 110 can be screwed on the back chassis 120 to prevent the rotary piece from departing.

Figure 4B:
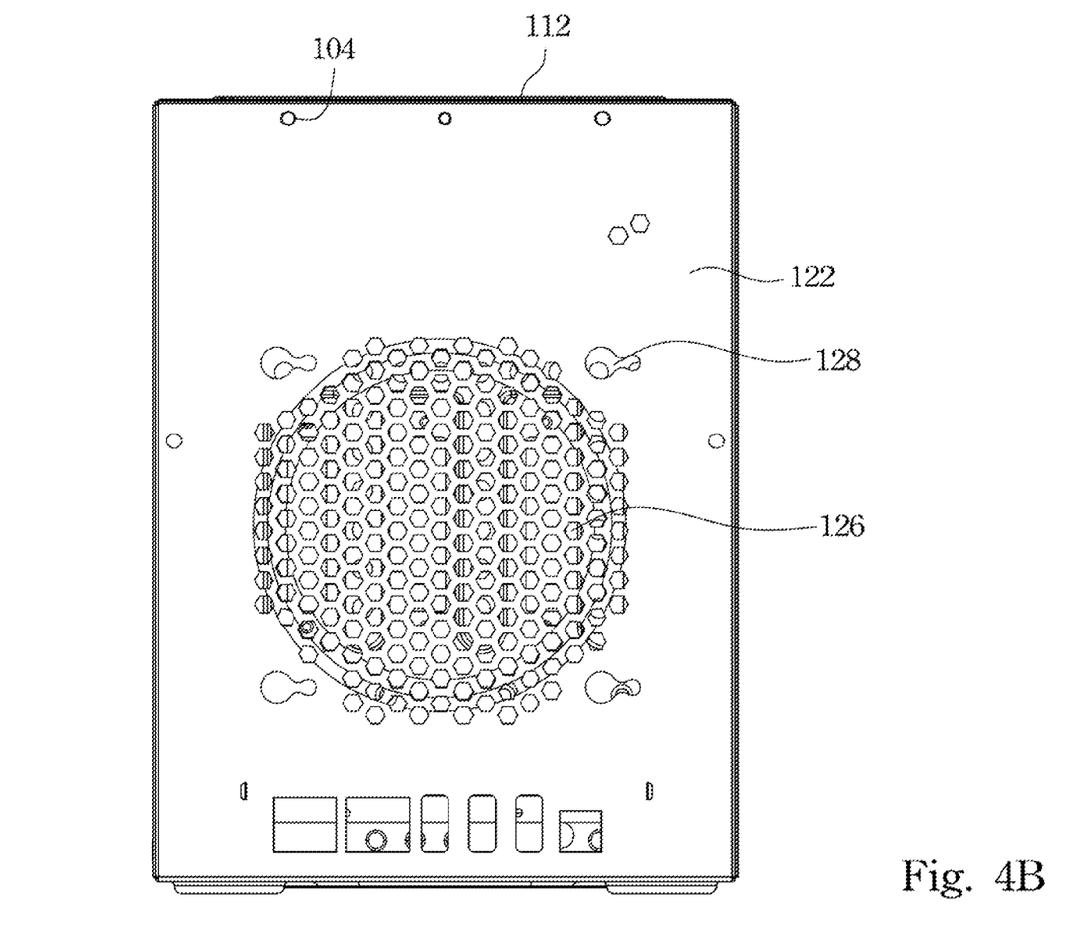
FIG. 4B is a back view diagram of the assembled hard disk device frame of the invention.

Refer to FIG. 4B. FIG. 4B is a back view diagram of the assembled hard disk device frame of the invention. Plural screw holes 104 are formed on the upper board 112 and the back board 122. The rotary piece with the front chassis 110 can be screwed on the back chassis 120 to prevent the rotary piece from departing. Plural suspension holes 128 are formed on the back board 122 of the back chassis 120. The suspension holes 128 are arranged surrounding the cooling holes 126. The fan (not shown) can be fastened on the suspension holes 128 and be arranged next to the cooling holes 126.

According to the present embodiments, the invention has following advantages. The rotary piece can be pivoted relative to the back chassis to expose or hide the fan, the main board, and the hard disk devices for easily assembling or changing the fan, the main board, and the hard disk devices. The additional components for fastening the fan and the main board can be omitted and the cost of assembly can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A hard disk device frame for fastening a plurality of hard disk devices, a fan, and a main board, the hard disk device frame comprising:
   a rotary piece comprising:
      a front chassis having an opening, wherein the front chassis comprises a front board and an upper board, and the opening is disposed on the front board; and a bracket fixed on the front chassis, wherein the hard disk devices enter the opening and couple to the bracket;

a back chassis, wherein the back chassis comprises a back board and a lower board, and the fan and the main board are fixed on the back chassis; and a plurality of hinges to connect the front board to the lower board, wherein the opening is exposed to allow the hard disk devices to enter the bracket via the opening when the upper board touches the back board, thereby the rotary piece is pivoted relative to the back chassis to hide or expose the fan and the main board on the back chassis, wherein the lower board is substantially perpendicular to the front board and parallel to the upper board, and the back board is substantially parallel to the front board and perpendicular to the upper board in an assembly state.

2. The hard disk device frame of claim 1, wherein the bracket comprises a first bracket side all, a second bracket sidewall and a third bracket sidewall connected to opposite sides of the first bracket sidewall; the first bracket sidewall is substantially perpendicular to the lower board; the second bracket sidewall and the third bracket sidewall are substantially perpendicular to the first bracket sidewall.

3. The hard disk device frame of claim 2, further comprising a plurality of hard disk device connectors disposed on the first bracket sidewall, wherein the hard disk devices are coupled to the hard disk connectors.

4. The hard disk device frame of claim 2, wherein the back board comprises a plurality of cooling holes; the fan is coupled to the back board and is located between the first bracket sidewall and the back board.

5. The hard disk device frame of claim 1, wherein the rotary piece further comprises a cage fixed in the front chassis and the bracket; the cage comprises a first cage sidewall, and second cage sidewall and a third cage sidewall connected to opposite sides of the first cage sidewall; the second cage sidewall and the third cage sidewall are perpendicular to the first cage sidewall; the second cage sidewall is fixed on the upper board.

6. The hard disk device frame of claim 5, further comprising a plurality of positioning pins disposed on the lower board, wherein the main board is positioned on the lower board with the positioning pins.

7. The hard disk device frame of claim 6, wherein the main board is disposed between the third cage sidewall and the lower board.

8. The hard disk device frame of claim 5, further comprising a plurality of blind riveting holes disposed on the front chassis, the bracket, and the cage to fasten the front chassis, the bracket, and the cage as the rotary piece.

9. The hard disk device frame of claim 1, further comprising a plurality of screw holes disposed on the rotary piece and the back chassis to fasten the rotary piece to the back chassis.

10. A hard disk device frame for fastening a plurality of hard disk devices, a fan, and a main board, the hard disk device frame comprising:

a rotary piece comprising:

a front chassis having an opening, wherein the front chassis comprises a front board and an upper board, and the opening is disposed on the front board, and a bracket fixed on the front chassis, wherein the hard disk devices en the opening and couple to the bracket; and a cage fixed in the front chassis and the bracket, wherein the cage comprises a first cage sidewall, and a second cage sidewall and a third cage sidewall connected to opposite sides of the first cage sidewall; the second cage sidewall and the third cage sidewall are perpendicular to the first cage sidewall;

the second cage sidewall is fixed on the upper board;

a back chassis, wherein the back chassis comprises a back board and a lower board, and the fan and the main board are fixed on the back chassis; and a plurality of hinges to connect the front chassis and the back chassis to the lower board, thereby the rotary piece is pivoted relative to the back chassis to hide or expose the fan and the main board on the back chassis.

11. The hard disk device frame of claim 10, further comprising a plurality of positioning pins disposed on the lower board, wherein the main board is positioned on the lower board with the positioning pins.

12. The hard disk device frame of claim 10, wherein the main board is disposed between the third cage sidewall and the lower board.

13. The hard disk device frame of claim 10, further comprising a plurality of blind riveting holes disposed on the front chassis, the bracket, and the cage to fasten the front chassis, the bracket, and the cage as the rotary piece.

* * * * *